United States Patent [19]

Gray

[11] E Re. 31,410

[45] Reissued Oct. 11, 1983

[54] RANEY ALLOY COATED CATHODE FOR CHLOR-ALKALI CELLS

[75] Inventor: Thomas J. Gray, Guilford, Conn.

[73] Assignee: Olin Corporation, New Haven, Conn.

[21] Appl. No.: 309,358

[22] Filed: Oct. 7, 1981

Related U.S. Patent Documents

Reissue of:

[64] Patent No.: 4,240,895
Issued: Dec. 23, 1980
Appl. No.: 25,153
Filed: Mar. 29, 1979

[51] Int. Cl.[3] ..... C25B 11/06

[52] U.S. Cl. ..... 204/290 R; 204/293

[58] Field of Search ..... 204/290 R, 290 F, 292, 204/293; 252/477 Q, 425.3

[56] References Cited

U.S. PATENT DOCUMENTS

| | | | |
|---|---|---|---|
| 3,291,714 | 12/1966 | Hall | 204/256 |
| 3,674,710 | 7/1972 | Richter et al. | 252/465 |
| 4,033,837 | 7/1977 | Kuo et al. | 204/98 |
| 4,043,946 | 8/1977 | Sanker et al. | 252/466 J |
| 4,049,580 | 9/1977 | Oden et al. | 252/466 J |
| 4,116,804 | 9/1978 | Needes | 204/284 |
| 4,153,578 | 5/1979 | De Thomas et al. | 252/438 |
| 4,162,204 | 7/1979 | Kuo | 204/43 R |
| 4,248,679 | 2/1981 | Welch et al. | 204/98 |
| 4,248,680 | 2/1981 | Carlin et al. | 204/98 |
| 4,251,478 | 2/1981 | Welch et al. | 204/98 |

FOREIGN PATENT DOCUMENTS

| | | | |
|---|---|---|---|
| 206867 | 12/1959 | Austria . | |
| 1094728 | 12/1960 | Fed. Rep. of Germany . | |
| 1909031 | 9/1970 | Fed. Rep. of Germany | 252/477 Q |
| 1928929 | 12/1970 | Fed. Rep. of Germany | 252/477 Q |
| 2704213 | 8/1977 | Fed. Rep. of Germany . | |
| 51-47672 | 12/1976 | Japan | 252/477 Q |

OTHER PUBLICATIONS

Vielstich, Chemie-Ing. Techn. 34 (5) 346-349 (1962).
Yasumura et al., Ind. Eng. Chem. Prod. Res. Develop., vol. 11, No. 3, 290-293 (3/1972).
Zavorin et al., Kinetika i Kataliy 18 (4) pp. 988-994, Jul.-Aug. 1977.
Golin et al., Elektrokhimiya 13 (7) 1052-1056, Jul. 1977.
Baird et al., Ind. Eng. Chem., Prod. Res. Dev. 16 (2) pp. 142-146, 2-77.

*Primary Examiner*—F. Edmundson
*Attorney, Agent, or Firm*—Arthur E. Oaks; Donald F. Clements

[57] ABSTRACT

An improved cathode with a conductive metal core and a Raney-type catalytic surface predominantly derived from an adherent [$NiAl_3$] *Beta Nickel* (*$NiAl_3$*) crystalline precursory outer portion of the metal core is disclosed. The precursory outer portion preferably has molybdenum added to give a precursor alloy having the formula $Ni_xMo_{1-x}Al_3$ where x is within the range of from about [5] *95* to about 15 weight percent. Also disclosed is a method of producing a low overvoltage cathode. The method includes the steps of taking a Ni-Mo core or substrate having about 5-20 weight percentage of Mo and coating it with aluminum then heat treating to form a Ni-Mo-Al alloy with mostly [$NiAl_3$] *a Beta Nickel* structure and then leaching out the Al to produce a Raney surface.

3 Claims, 8 Drawing Figures

NOTE: ALL SPECIMENS HEAT TREATED 10 MINUTES AT 725°C IN INERT ATMOSPHERE.

AFTER RANEY TREATMENT BUT BEFORE CELL TESTING

AFTER SEVEN WEEKS IN MEMBRANE CELL

Ni DIPPED IN MOLTEN al THEN REMOVED AND HELD AT 610°C FOR 2 HOURS NOT LEACHED

RANEY ALLOY COATED CATHODE FOR CHLOR-ALKALI CELLS

Matter enclosed in heavy brackets [ ] appears in the original patent but forms no part of this reissue specification; matter printed in italics indicates the additions made by reissue.

FIELD OF INVENTION

The invention relates to an improved Raneyized hydrogen evolution cathode for chlor-alkali electrolytic cells.

PRIOR ART STATEMENT

In view of the phenomental jump in energy costs and the increased scarcity of industrial fuel supplies, there has been and continues to be a flurry of research activity in the electrolysis field to find ways to reduce the amount of power used in electrolysis processes. For many years it has been customary to use steel cathodes in chlor-alkali diaphragm cells, even though a substantial amount of power is used in overcoming what is called "hydrogen overvoltage" at the cathode. Hydrogen overvoltage is largely an inherent characteristic of the metallic surface in contact with the electrolyte so there is a continual need and desire to come up with better cathode surfaces to reduce this overvoltage and thereby decrease the power consumption of the cell.

It is known that active, porous nickel can be produced by selectively dissolving a soluble component, such as aluminum or zinc, out of an alloy of nickel and the soluble component. A porous nickel of this type and the alloy from which it is produced are generally called "Raney nickel" or "Raney alloy" after their inventor. See U.S. Pat. Nos. 1,563,787 (1925), 1,628,191 (1927) and 1,915,473 (1933). There are various methods for producing this Raney nickel, and various applications for this metal are known.

It is also known to use such Raney nickel surfaces on cathodes for chlor-alkali cells. For example, U.S. Pat. No. 4,116,804 filed Nov. 17, 1976 and issued Sept. 26, 1978 to C. Needes and assigned to DuPont de Nemours described an electrode, hereafter "Needes electrode", for use as a hydrogen evolution cathode in electrolytic cells in which a cohesive surface layer of Raney nickel is in electrical contact with a conductive metal core having an outer layer of at least 15 percent nickel (see Table 4 thereof), characterized in that the surface layer of Raney nickel is thicker than 75 μm and has a mean porosity of at least 11 percent. The catalytic surface layer consists predominantly of $Ni_2Al_3$ grains from which at least 60 percent of aluminum has been leached out with an aqueous base. An overvoltage of about 60 millivolts is alleged. To phrase the same thing relative to conventional cathodes, reductions of 315 to 345 millivolts in hydrogen overvoltage as compared with mild steel cathodes is alleged. However, subsequent testing indicates much higher overvoltages and actual reductions of only 100–150 millivolts. Furthermore, spalling or delamination of the coating has been observed upon additional testing. The patent teaches that any Raney nickel which forms from the $NiAl_3$ phase is mechanically weak and does not adhere well and is generally lost during leaching. The patent also teaches that $Ni_2Al_3$ (Gamma phase) is the preferred intermetallic precursor and governs the activity of the coating and that the heat treatment should be such that the proportion of $Ni_2Al_3$ is maximized. This mechanical weakness of Raney nickel from $NiAl_3$ is unfortunate because it was previously known that Raney Ni from $NiAl_3$ (Beta phase) is more active for hydrogen desorption than in Raney Ni from $Ni_2Al_3$ (Gamma phase). See for example A. A. Zavorin et al Kinetika i Kataliz, Vol. 18, No. 4, pp. 988–994, (USSR, July–August, 1977) which explains hydrogen is more weakly "bonded" in Raney Ni from $NiAl_3$ than from $Ni_2Al_3$, that there are more hydrogen adsorption centers in Raney Ni from $NiAl_3$ than $Ni_2Al_3$ and that the heat of desorption is lower for Raney Ni from $NiAl_3$ and $Ni_2Al_3$.

Golin, Karaseva and Serykh in Elektrokhimiya, Vol. 13, No. 7, pp. 1052–1056 (USSR, July, 1977) disclose a 10 percent Mo, 45 percent Ni, 45 percent Al alloy which, upon leaching, yields a Raney catalytic surface with extremely low activation energy for hydrogen oxidation such as would occur in a hydrogen-oxygen fuel cell. No mention of hydrogen evolution (i.e. hydrogen reduction) catalysis is given or suggested.

Austrian Patent No. 206,867 issued Dec. 28, 1959 to Ruhrchemie A. G. and Steinkohlen Electrizitat A. G. gives a detailed discussion of preparation of thin foil electrodes with a "double-skeletal catalyst" coating of 20–80 percent Raney metal with 80–20 percent skeletal material (e.g. Ni powder). Page 3, column 2 lists a number of sintered powder metal alloys suitable for catalytic coatings on the foil. German Auslegeschrift No. 1,094,723 by W. Vielstich, E. Justi and A. Winsel-Ruhrchemie A. G. published Dec. 15, 1960 suggests (page 3, lines 24–70) use of such a "double skeletal catalyst" coated foil improved by adding (page 3, lines 54–63) 1–20 percent of a Group VIII metal as the cathode of an amalgam decomposer of a mercury type chlor-alkali cell system. However, such sintered coatings have been found to delaminate after relatively short use as diaphragm or membrane cell cathodes.

Baird and Steffgen in Ind. Eng. Chem., Prod. Res. Dev., Vol. 16, No. 2 (1977) in an article entitled "Methanation Studies on Nickel Flame-Sprayed Catalysts", describe the temperature ranges for the various intermetallics and say $NiAl_3$ is the major phase produced during heat treatments for 1, 10 or 30 minutes at about 725° C. and that no more than 10 minutes is required at 725° C. for alloying. When heat treated at 725° C., the alloy was found to have the greatest activity for carbon monoxide conversion catalysis (see FIG. 2 thereof). $NiAl_3$ is described as believed to be the most active intermetallic phase "as shown by Petrov et al (1969)" and photomicrographs are provided to show the structure.

U.S. Pat. No. 4,033,837 by Kuo et al issued July 5, 1977 teaches use of a Ni-Mo-V catalytic coated copper cathode which achieves a relatively low over-voltage. While this cathode has a significantly lower overvoltage than a steel electrode, copper-fouling or iron-fouling can be a problem unless the catholyte solution is kept free of iron. No mention of Raney treatment is made.

U.S. Pat. No. 3,291,714 issued Dec. 12, 1966 to Hall discloses a number of coatings for steel or titanium cathodes, among such coatings a Ni-Mo coating and a Fe-Ni-Mo coating were found most desirable. Heat treatment of the electrodeposited coating was required to avoid delamination of the coatings. Moderately low overvoltages were alleged. No mention of Raney treatment is given.

West German Offenlegungsschrift No. 2,704,213 published Aug. 11, 1977 claiming priority of U.S. Ser. No. 655,429 filed Feb. 2, 1976 by Macmullin discloses a Raney-nickel cathode in the form of a plate or a porous Raney-Ni coated perforated nickel plate. The cathode is designed for chlor-alkali membrane cells, but was, as stated in the example therein, apparently only tested in "a small laboratory cell". The cathode is prepared by creating a nickel-aluminum alloy, pouring a plate of the alloy and then leaching out the aluminum. Molybdenum is not mentioned.

W. Vielstich in Chem. Ing. Techn., Vol. 33, pp. 75–79, (1961) describes a "dual-frame" electrode made of Raney nickel, which is prepared by mixing a powdered Raney alloy (e.g. of nickel and an alloying component, such as aluminum) with a frame metal consisting of pure metal powder (e.g. carbonyl-nickel), pressing, sintering, and then dissolving out the alloying component from which the Raney alloy is prepared. The surface layer of such an electrode consists of a dispersion of active Raney nickel particles, which is embedded in a frame made of inactive solid nickel particles. This electrode is used, among other things, as a hydrogen evolution cathode in a chlorine-alkali electrolysis diaphragm cell. Double-frame electrodes produced by the methods of powder metallurgy, however, have insufficient mechanical strength to be suitable for producing large mesh electrodes such as those which are desired for industrial scale electrolysis of sodium chloride solutions.

One process for producing flat material from Raney nickel consists of the fact that fused particles of a Raney alloy precursor (e.g., an alloy of nickel and aluminum) are sprayed onto a metallic carrier, and the aluminum is then selectively dissolved out; see U.S. Pat. No. 3,637,437. This material is suggested as a material for catalytic cathodes of fuel cells. Cathodes produced according to this method, however, generally have surfaces of low porosity and have a tendency to break apart.

U.S. Pat. No. 3,272,728 and German Offenlegungsschrift No. 2,527,386 (based on U.S. Patent Application Serial No. 489,284) describe electrodes with Raney nickel surfaces which are produced by simultaneously electrodepositing nickel and zinc from an inorganic electrolyte bath on a metal carrier (such as steel) and then selectively dissolving zinc out of the Ni-Zn alloy thus produced. This electrode treatment is supposed to reduce hydrogen overvoltage of steel cathodes by up to 150 millivolts. U.S. Pat. No. 4,104,133 issued Aug. 1, 1978 discloses one method alleged to be useful to put this Ni-Zn Raney coating technology into commercial practice by use of metallic plating anodes for deliberately electroplating a Ni-Zn coating onto the cathode in-situ in a chlor-alkali cell and subsequently leaching the zinc out to give a Raney nickel surface and lower the hydrogen overvoltage of the chlor-alkali cell. However, only layers of a very crude temporary Raney alloy form. Permanent coatings of greater overvoltage reductions are desired.

British Pat. No. 1,289,751 describes a process for producing porous nickel electrodes for electrochemical cells or fuel cells by electrodeposition of aluminum from an electrolyte containing an organoaluminum complex on a support made of nickel or a nickel alloy, wherein some of the aluminum deposited diffuses into the nickel, forming an alloy, from which aluminum is then leached. The diffusion is carried out over a period of 1 or 2 hours in an inert atmosphere at a temperature of less than 659° C., preferably between 350° and 650° C. Very thin electrodeposited layers, 5–20 μm thick are described.

J. Yasamura and T. Yoshino in a report on "Laminated Raney Nickel Catalysts" in Ind. Chem. Prod. Res. Dev., Vol. 11, No. 3, pp. 290–293, 1972, describe the production of Raney nickel plates, though not in connection with electrodes, by spraying molten aluminum onto a nickel plate, heating for 1 hour in a nitrogen atmosphere at 700° C. to form a 0.2 mm-thick layer of $NiAl_3$ and dissolving aluminum out of the layer. The product thus obtained is supposed to be usable as a hydrogenation (i.e. hydrogen oxidation) catalyst.

Another method of preparing molded articles from Raney nickel for use as hydrogenation catalysts is described in U.S. Pat. No. 3,846,344. According to this patent, a nickel-plated metal pipe is coated with an aluminum layer at least 0.02 mm thick, then the aluminum is permitted to diffuse into the nickel by heat treating for at least 30 minutes at a temperature of at least about 480° C., and then the aluminum is selectively dissolved out of the diffusion layer. Example 5 of the patent describes how a 25 mm-diameter pipe with a 1 mm-thick electrodeposited nickel layer, on which a 0.5 mm-thick aluminum layer has been deposited by flame spraying, is subjected to 6 hours of diffusion heat treatment at 650° C., in order to produce a diffusion layer at least 0.05 mm thick. The pipe is then activated by immersing for 8 hours in 25 percent aqueous sodium hydroxide solution. The patent states that the surface displays a high degree of efficacy for the catalystic hydrogenation of cyclohexane.

U.S. Pat. No. 3,407,231 describes a process for producing a negative electrode with an active porous nickel surface for use in alkaline batteries. According to the patent, the electrode is produced by bringing aluminum into contact with the surface of a nickel-containing core at an elevated temperature, so that nickel and aluminum interdiffuse to form a layer of Gamma phase nickel aluminide ($Ni_2Al_3$), after which the aluminum which has diffused in is dissolved out with alkali hydroxide and a layer of active nickel is obtained, which is metallurgically bonded to the core. The patent mentions diffusion temperatures of 625° to 900° C., diffusion times of 8 to 16 hours, dissolution temperatures of 20° to 100° C., dissolution times of 1 to 32 hours, and coating thicknesses of 200 to 300 μm. In particular, the process is supposed to be carried out by placing a nickel sheet in a packet made of a mixture of about 58 percent $Al_2O_3$, 40 percent aluminum powder, and 2 percent $NH_4Cl$ and heating the packet for 8 hours in a reducing atmosphere at 800° C., so that a 200 μm-thick layer of $Ni_2Al_3$ forms on each side of the nickel sheet, after which the coated nickel core is immersed in 6 N sodium hydroxide for about 16 hours at 80° C., in order to dissolve out at least 85 percent of the aluminum. However, it has been found that Raney nickel surfaces of electrodes produced according to this special method have low porosity. The patent suggests that the nickel sheet be rolled between two aluminum sheets in order to produce a metallic bond, and the sandwich be heated in a reducing atmosphere at 543° C. Although temperatures below 649° C. are preferred in this particular embodiment, the patent also suggests temperatures of as high as 872° C. It has been found, however, that in the case of bonding by rolling the desired metallic bond does not form.

It is an object of this invention to provide a solution to the problem of producing a cathode for a chlor-alkali membrane or diaphragm cell which has a lower cathode polarization potential ("hydrogen overvoltage") for a longer period than the prior art electrodes noted above.

SUMMARY OF THE INVENTION

One solution is the present invention which provides an improved low overvoltage electrode for use as a hydrogen evolution cathode in an electrolytic cell, the electrode being of the type that has a Raney metal surface layer in electrical contact with a conductive metal core, wherein said improvement comprises: said Raney metal surface is predominantly derived from an adherent $NiAl_3$ crystalline precursory outer portion of said metal core.

Another solution provided by the invention is an improved low overvoltage electrode for use as a hydrogen evolution cathode in an electrolytic cell, the electrode being of the type that has a Raney metal surface layer in electrical contact with a conductive metal core, wherein the improvement comprises: said Raney metal surface layer is predominantly derived from adherent $Ni_xMo_{1-x}Al_3$ crystalline precursory surface layer, where x is less than 0.95.

A still further solution provided by the invention is an improved low overvoltage electrode for use in a hydrogen evolution cathode in an electrolytic cell, the electrode being of the type that has a Raney metal surface layer in electrical contact with a conductive metal core, wherein the improvement comprises: said Raney metal surface is derived from an adherent $NiAl_3$ (Beta phase) crystalline intermetallic layer stabilized by substitution of a stabilizing amount of a stabilizing metal for some of the nickel in the crystalline structure of said crystalline layer.

Yet another solution provided by the invention is a method of producing a low overvoltage electrode for use as a hydrogen evolution cathode in an electrolytic cell which comprises the steps of:

(a) coating with aluminum the surface of a clean non-porous conductive base metal structure of an alloy of 5–15 percent molybdenum and 95–85 percent nickel;

(b) heat treating said coated surface by maintaining said surface at a temperature of from 660° to 750° C. for a time sufficient to diffuse a portion of said aluminum into outer portions of said structure to produce an integral nickel-molybdenum-aluminum alloy layer in said outer portions consisting predominantly of $NiAl_3$ grains but insufficient to create a predominance of $Ni_2Al_3$ grains in said outer portions; and (c) leaching out residual aluminum and intermetallics from the alloy layer until a Raney nickel-molybdenum layer is formed integral with said structure.

BRIEF DESCRIPTION OF THE DRAWING

The invention will be better understood by reference to the attached drawing which is provided by way of illustration and in which.

DETAILED DESCRIPTION OF PREFERRED EMBODIMENTS

Figure 1:
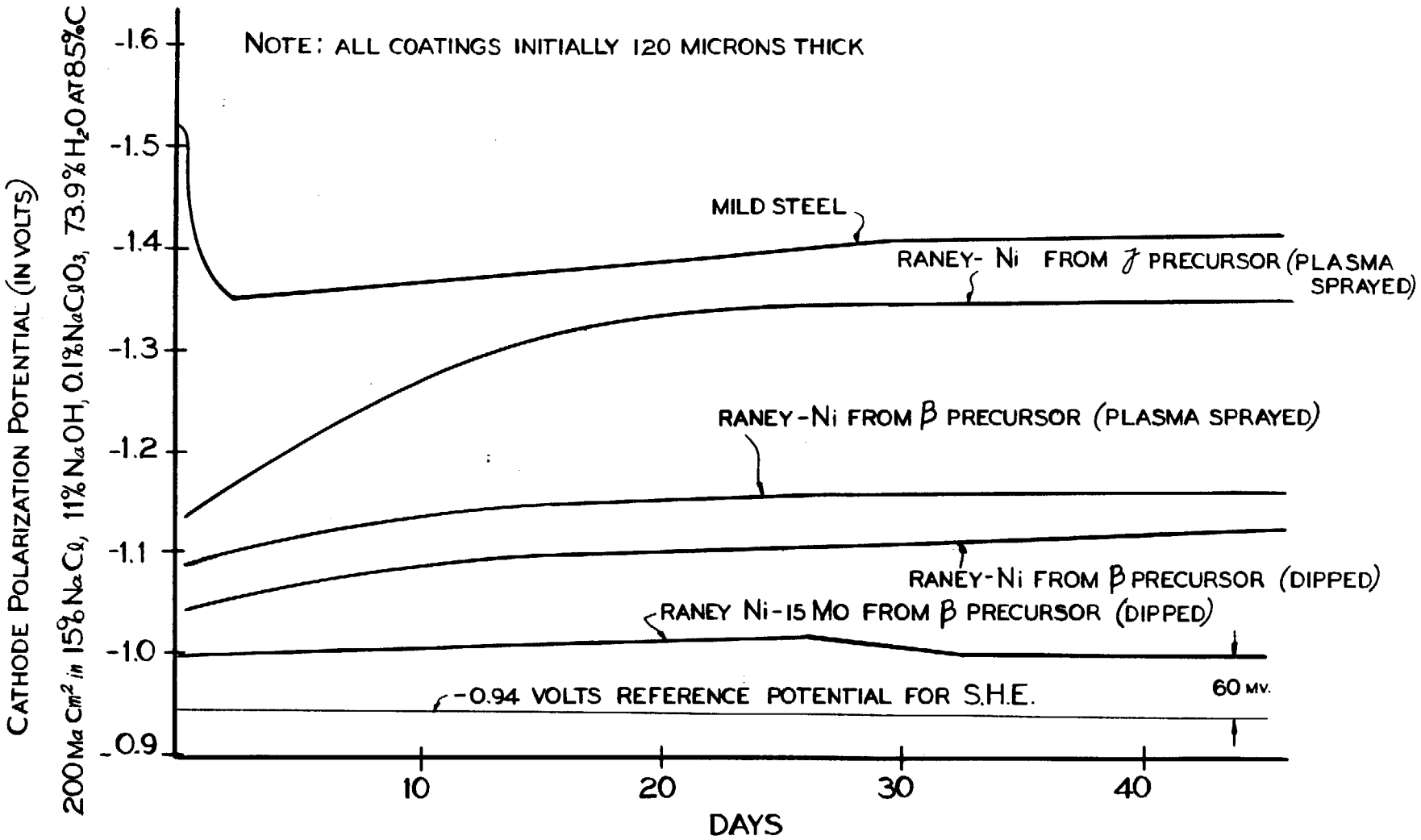
FIG. 1 is a graph of polarization potential (ref. standard hydrogen electrode) versus time for a number of cathodes.

FIG. 1 graphically shows the cathode polarization potentials using three different Raney-treated cathodes in a typical chlor-alkali cell environment. The Raney nickel coatings of the present invention which were produced from Beta phase ($NiAl_3$) precursors had 150–250 less potential than the Raney nickel from a Gamma phase ($Ni_2Al_3$) precursor. FIG. 1 also shows that the Raney nickel cathode of the invention with 15 percent by weight molybdenum from a molybdenum enriched Beta phase ($Ni_xMo_{1-x}Al_3$) precursor (hereafter $\beta$-Raney Ni-15Mo) exhibited about 80 to 120 millivolts less cathode polarization potential and hence 80–120 mV less overvoltage. Also, the $\beta$-Raney Ni-15Mo had a constant overvoltage of approximately 60 millivolts over the entire seven week period shown. This is in contrast to all the other coatings tested in FIG. 1 which exhibited significant potential increases. As noted before, the $\beta$-Raney Ni-15Mo did not exhibit any iron-fouling and did not have any appreciable thinning. The constant low overvoltage level is believed to be a result of this surprisingly unexpected constant nature of the coating during actual performance. It is seen that the mild steel sample, which started at about 540 millivolts overvoltage (i.e./(−0.94)-(−1.500)/volts), actually decreased in overpotential and then started rising. The explanation is the overplating of iron which has been recently found by others to cause increased roughness and hence lower actual current density and therefore lower overvoltage. It is well known that overpotential generally decreases when current density decreases. (See FIGS. 2 and 4). FIG. 1 further shows that a major problem exists with prior art Raney nickel prepared from a purely Gamma phase intermetallic structure (hereafter G-Raney Ni). The prior art G-Raney Ni cathode exhibited both significant spalling and iron pick-up.

Figure 2:
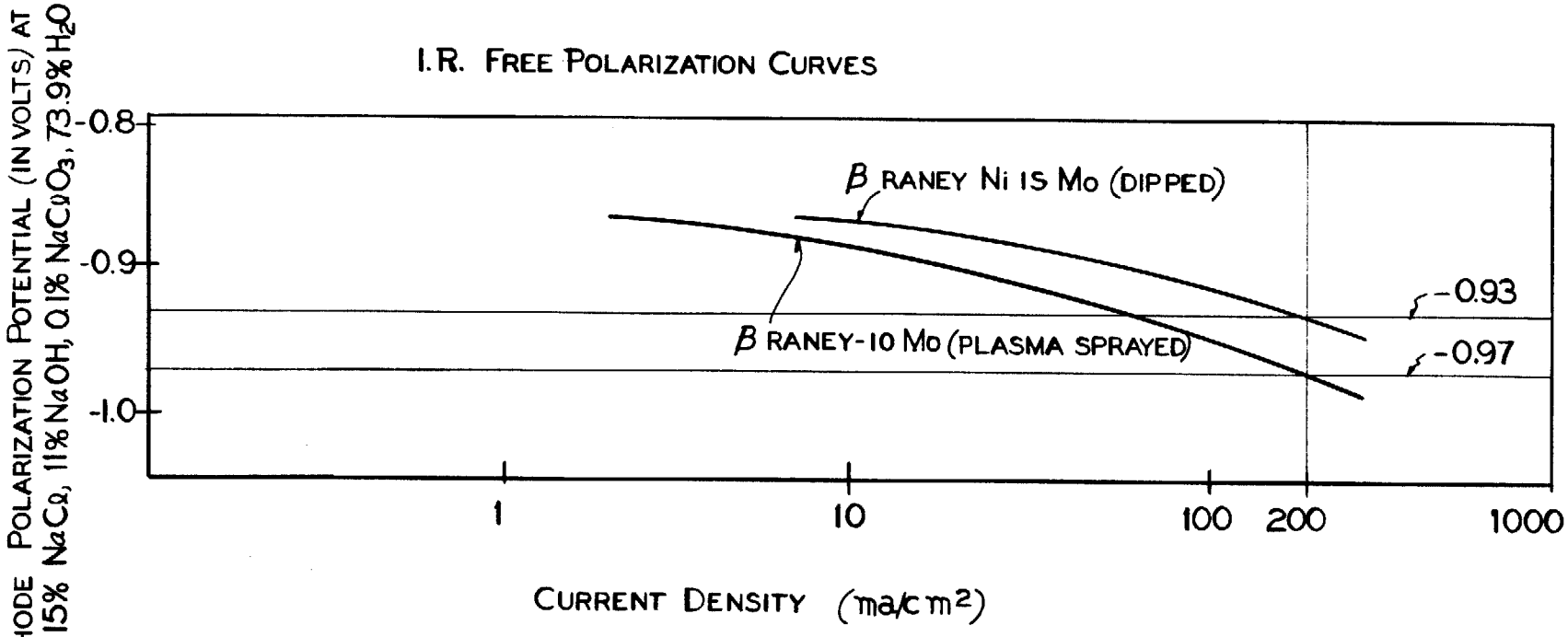
FIG. 2 is a graph of polarization potentional (ref. standard hydrogen electrode) versus current density for two cathodes of the invention.
Figure 3:
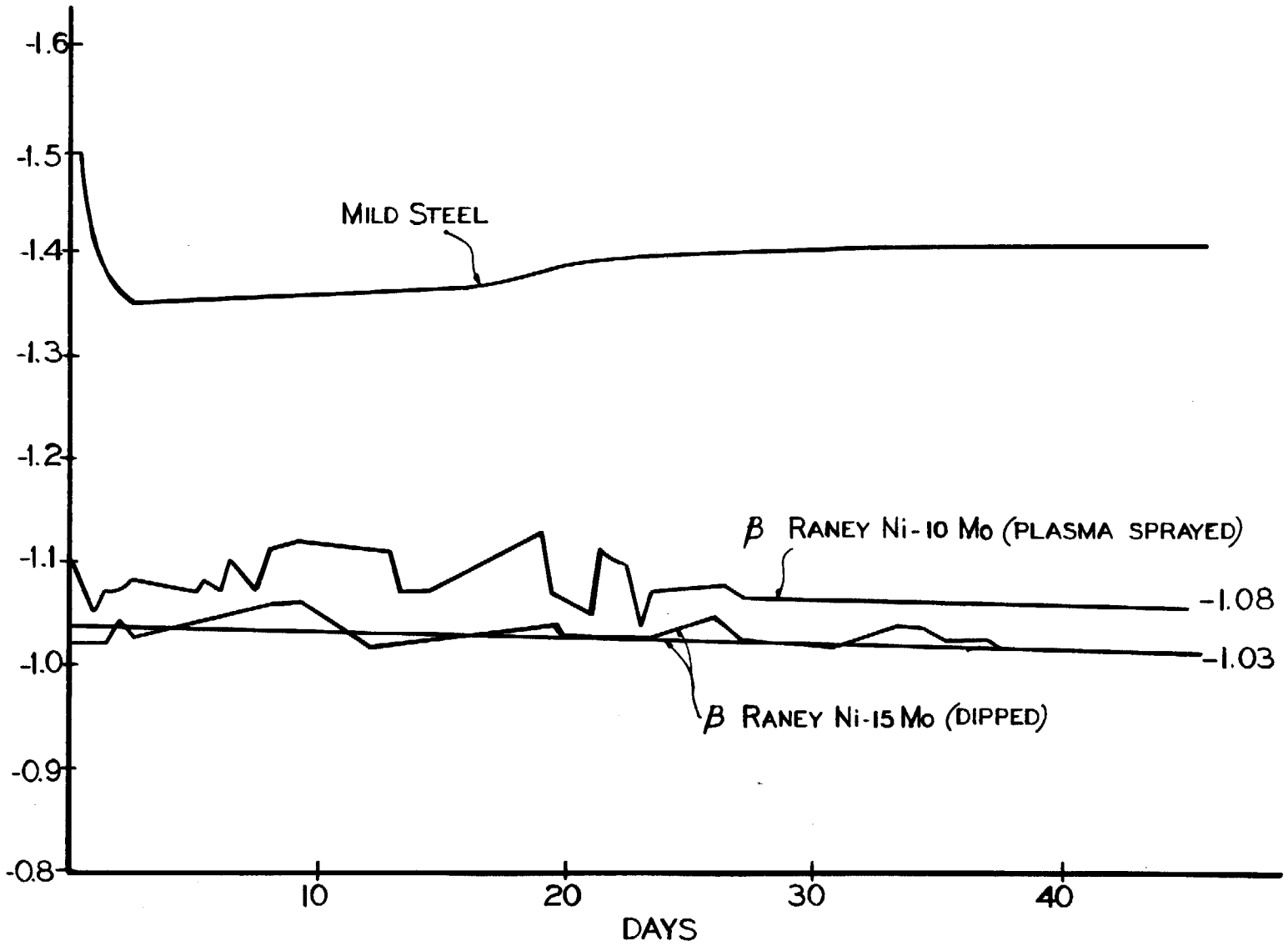
FIG. 3 is a graph of polarization potential versus time for three cathodes of the invention.

FIGS. 2 and 3 show the overpotential curves versus current density and time, respectively, for two catalytically coated cathodes of the invention, all prepared from Beta phase precursor. Each has a different percent by weight of molybdenum (10% for Ni-10Mo, 15% for Ni-15Mo) and a different method (plasma spraying and dipping) of depositing the aluminum prior to identical heat treatment. Dipping a Ni-15Mo substrate in molten aluminum was found to produce, upon subsequent Raney treatment, a β-Raney Ni-15Mo cathode having about 20–40 millivolts less cathode overvoltage than that exhibited by a β-Raney Ni-10Mo cathode with a Ni-10Mo substrate on which the aluminum had been plasma sprayed prior to Raney treatment. The reason for this difference is not known, although the result was confirmed. It is believed that the difference in molybdenum content was primarily responsible.

Figure 4:
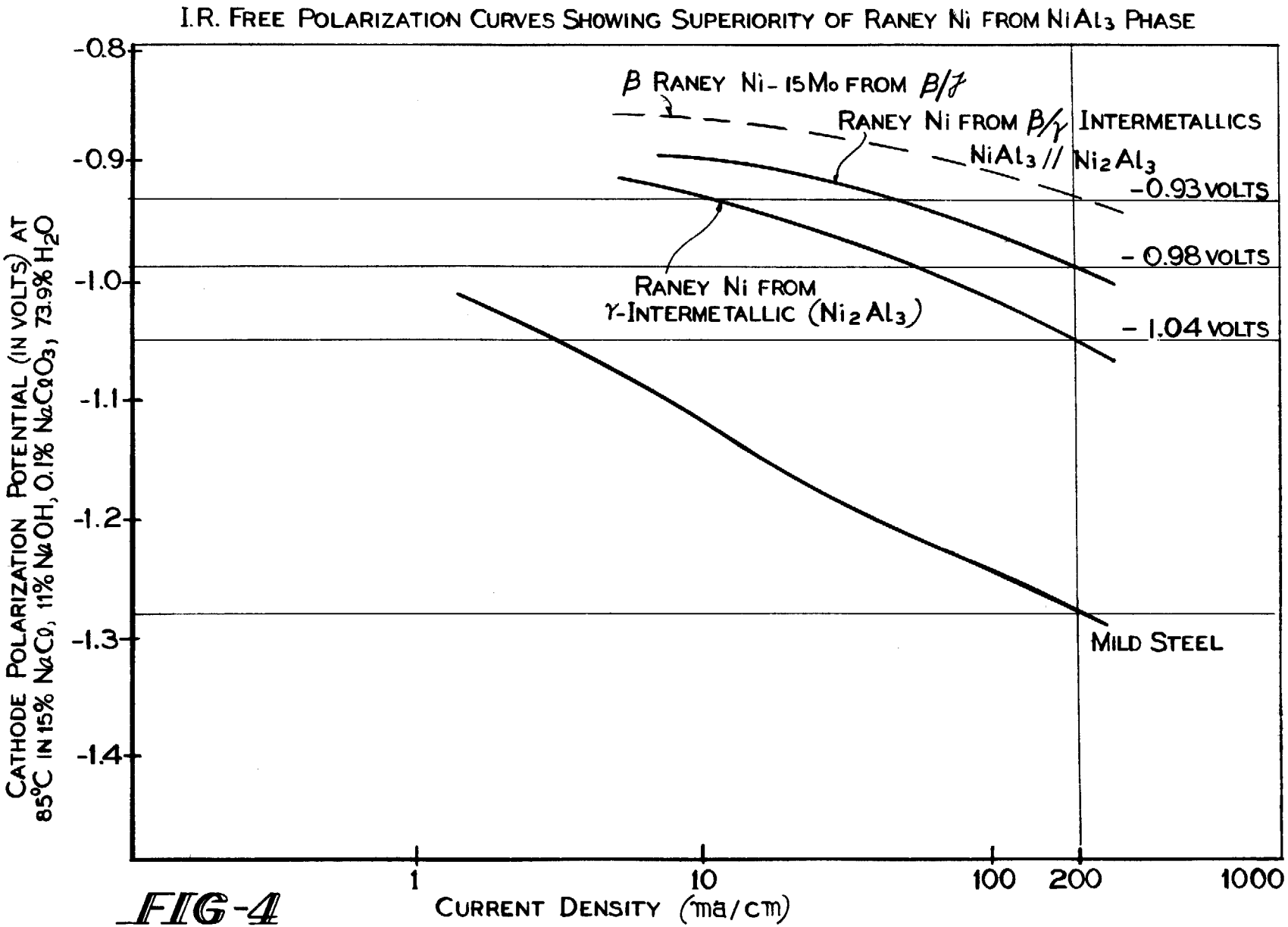
FIG. 4 is a comparison graph of IR Free polarization potentials for the cathode of the invention and prior art cathodes.

FIG. 4 is a polarization versus current density graph showing the relative overpotentials of β-Raney Ni cathodes of the invention and prior art G-Raney Ni cathodes showing that β-Raney Ni is initially about 60 millivolts lower in overpotential than G-Raney Ni. Referring to FIG. 1, it is seen that this difference increases with time.

Figure 5:
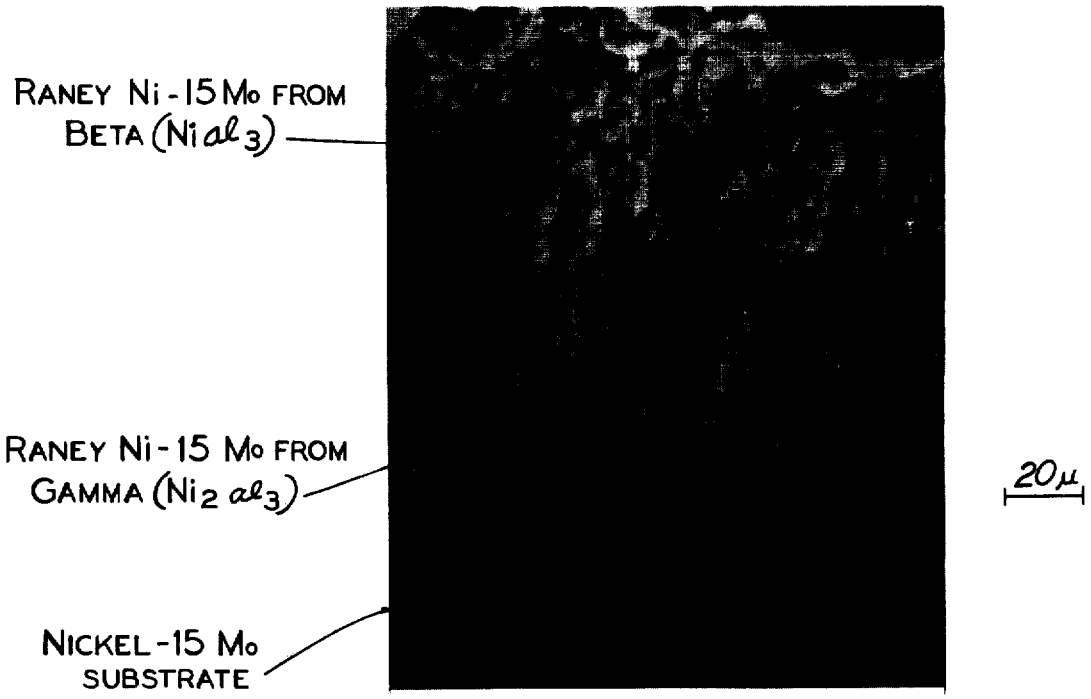
FIG. 5 is a photomicrograph of the coating of a cathode of the invention showing a predominance of Raney Ni-15 Mo formed from $N_{0.85}Mo_{0.15}$ $Al_3$ (Beta phase) precursor, as it appears just after the Raney treatment.

FIG. 5 is a 700X magnification cross-sectional view of a β-Raney Ni-15Mo coating of the invention taken with a scanning electron microscope (SEM) showing at the bottom the core or substrate of nickel alloy with 15% by weight molybdenum (Ni-15Mo); a 40 micron layer of the Gamma phase (from $Ni_2Al_3$ precursor) Raney Ni-15Mo or "G-Raney Ni-15Mo", immediately above the core and a 120 micron layer of the Beta phase (from $NiAl_3$ precursor) Raney Ni-15Mo or "β-Raney Ni-15Mo" atop the G-Raney Ni-15Mo layer. A portion of a conventional medium in which the metal specimen was mounted appears at the upper right hand corner. It is seen that the β-Raney Ni-15Mo layer is three times as thick as the G-Raney Ni-15Mo layer and the β-Raney Ni-15Mo layer is the outer layer and thus will be the layer in contact with any electrolyte in which the coated core is placed. Thus the β-Raney Ni-15Mo controls the activity of the coating. Further, the β-Raney Ni-15Mo does not fall off in the leaching step. Since the β-Raney Ni-15Mo predominates, this whole coating of FIG. 5 is collectively called a β-Raney Ni-15Mo coating.

Figure 6:
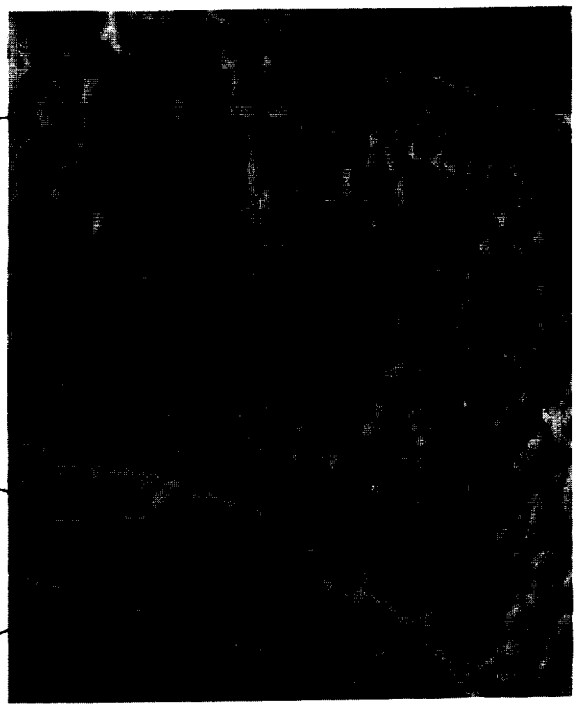
FIG. 6 is a photomicrograph of the coating of the cathode of FIG. 5 as it appeared after the electrolytic test of FIG. 1 showing the Beta phase structure still largely intact and with essentially no iron overplating and no thinning of the coating.

FIG. 6 is a 700X magnification SEM photomicrograph substantially identical to FIG. 5 except that it is taken after the coated core of FIG. 5 was operated for over six weeks in a laboratory scale membrane cell under conditions simulating a typical commercial chlor-alkali diaphragm cell. The β-Raney Ni-15Mo coating did not experience any appreciable thinning after six weeks in a diaphragm cell catholyte, thus demonstrating that the β-Raney Ni-15Mo does not fall off.

Figure 7:
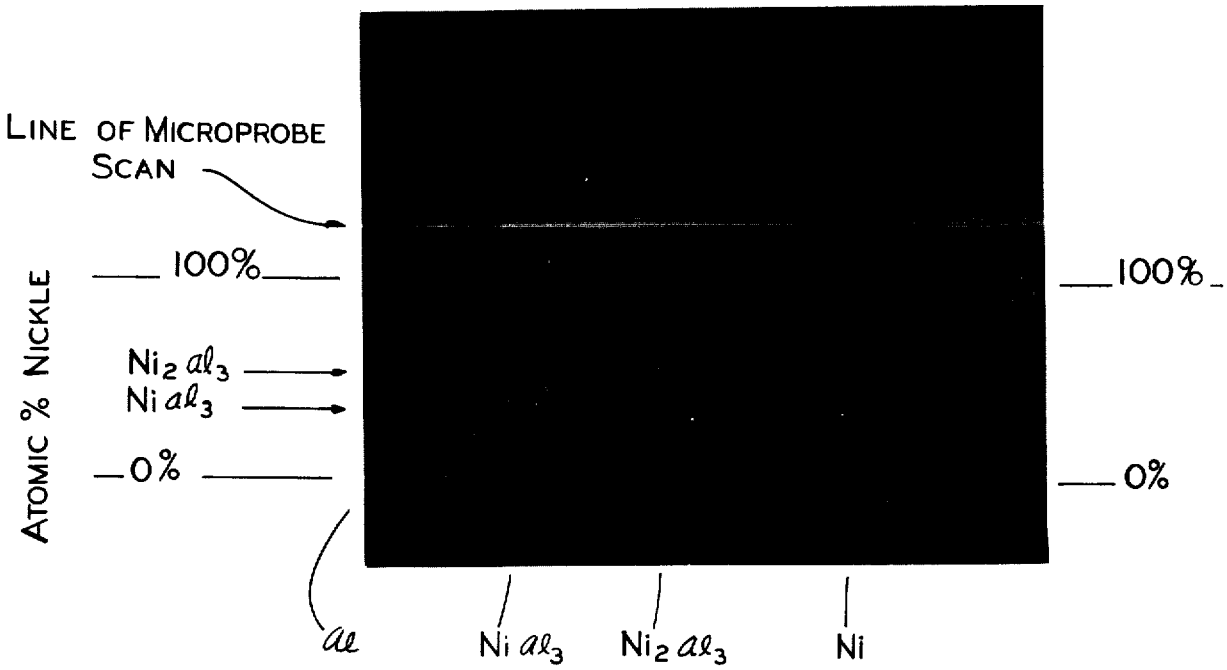
FIG. 7 is a microprobe photograph and readout showing the aluminum, Beta ($NiAl_3$), Gamma ($Ni_2Al_3$) and nickel phase precursors prior to leaching.

FIG. 7 shows how the interdiffusion of nickel and aluminum proceeds at 610° C. A given weight of $Ni_2Al_3$ has about 50 percent less aluminum than the same weight of $NiAl_3$. When there is an unlimited reservoir of aluminum and the alloying temperature is within the 660° C. to 860° C. range of the invention, an $NiAl_3$ layer forms adjacent the aluminum reservoir and an $Ni_2Al_3$ underneath. In FIG. 7 the aluminum is at the far left side of the microphotograph, while nickel is at the far right. This is seen to occur even at temperatures as low as 610° C. if the treatment is long enough. However, in FIG. 7 the $NiAl_3$ (Beta) layer is only 5–10 microns thick while the $Ni_2Al_3$ (Gamma) layer is about 35 microns thick as is proven by the microprobe readout. The solid white horizontal line on the photograph is the "scan" line along which the microprobe scanned and the white dots are the relative atomic percent nickel found at the corresponding location on the scan line. The corresponding location on the scan line is that point on the scan line which is directly above the corresponding dot. This preponderance of Gamma phase is similarly pronounced at higher temperatures and similar heat treatment times. However, in FIGS. 5 and 6 where a Ni-15Mo alloy was used it was found that the Beta phase predominates. It is thus believed the molybdenum stabilizes the $NiAl_3$ phase so as to yield a constant surprisingly low overvoltage upon subsequent leaching. The overvoltage reductions are based on operation of the electrode as the cathode in a brine electrolysis cell at a current density of 200 milliamps per square centimeter (i.e. 200 ma/cm$^2$ or 2 KA/m$^2$), which is typical of current densities found in conventional diaphragm chlor-alkali cells.

All voltage values quoted herein are based on the 200 ma/cm$^2$ current density, although the electrodes are equally suitable for operation over a broad range of other current densities.

The porous nickel surface layer of the electrode of the present invention is formed on a metallic nickel core with which it is in electrical contact. The core material may be any conductive metal or alloy, but is preferably nickel or a nickel-molybdenum alloy so that the substrate itself forms the coating after Raney treatment.

The electrode can be in the form of any conveniently shaped plate or screen. For commercial brine electrolysis cells, expanded metal screens are preferred.

The electrode of the present invention may also bear an optional, very thin coating of nickel atop the porous nickel surface. The very thin coating, which is preferably 5 to 10 microns thick, improves the mechanical strength and surface stability of the porous nickel layer, without diminishing its electrochemical activity.

Electrodes of the invention are prepared by an improved process wherein an interdiffused nickel-aluminum alloy layer is formed, from which aluminum is subsequently selectively leached. The process includes the steps of (a) preparing a metallic core with a nickel-bearing outer layer, (b) aluminizing the surface of the core, (c) interdiffusing the aluminum and nickel, (d) selectively leaching aluminum from the interdiffused material, (e) optionally chemically treating to prevent potential pyrophoricity and (f) optionally coating with nickel to improve the mechanical properties of the final surface.

The metallic core which comprises the starting material for the electrode is prepared to have a nickel-bearing outer layer in which the nickel concentration is at least 15 percent, and preferably at least 18 percent by weight. When the core is of substantially pure nickel or an appropriate nickel-bearing alloy such as [Iconel] *Inconel* 600, Hastelloy C or 310 Stainless Steel, the core inherently has the desired nickel-bearing outer layer.

It is most preferred to have outer portions of the "core" ("core" is used interchangeably herein with "substrate") itself serve as the nickel-bearing outer layer, since this helps eliminate or reduce spalling of the coating by eliminating or reducing the possibility of corrosion at the interface between the outer layer and core by making the interface much less abrupt.

For cores of other metals or alloys, a nickel coating can be deposited on the core by known techniques, such as metal dipping, electroplating, electroless plating and the like. The nickel-bearing outer layer of the core, whether provided by the core metal itself or as a deposited coating, is conveniently at least 100 microns thick, and preferably at least 150 microns thick. The maximum thickness of the nickel-bearing outer layer is a matter of convenience and economic choice. Although cores in the form of screens or plates, especially screens, are preferred, cores made from foils, wires, tubes or expanded metal are also suitable. The nickel-bearing surface of the core, prior to further processing, is thoroughly cleaned by conventional means, such as chemical cleaning and/or grit blasting, to improve the bond between the nickel-bearing surface of the core and subsequently applied layers.

The cleaned surface of the core is subjected to an aluminizing treatment. By "aluminizing", as used herein, is meant that aluminum is brought into intimate contact with the nickel-bearing material at the surface of the core so that when heated during the interdiffusion step the desired nickel-aluminum alloy layer is formed. The aluminizing can be accomplished by any of several known methods, such as flame spraying aluminum onto the surface of the core, dipping the core into an aluminum melt or by use of fused salt electrolysis. Dipping is preferred since it has been found to yield the lowest overvoltage coating upon subsequent Raney treatment.

When using these methods of aluminizing, an aluminum layer of at least 100 micron thickness is deposited on the nickel-bearing surface of the core. Much thicker aluminum layers, of, for example, greater than 500 micron thickness, perform satisfactorily in the process, but for reasons of economy, aluminum layer thicknesses of between about 150- and 300-microns are preferred.

The interdiffusion step, which is usually the next step in the process, is carried out at a temperature of at least 660° C., i.e., above the normal melting point of aluminum. Higher temperatures, under 750° C. are suitable, with temperature within the range of from about 700° C. to about 750° C. and particularly from about 715° to about 735° C. being most preferred. Usually the interdiffusion is carried out in an atmosphere of hydrogen, nitrogen or an inert gas. This interdiffusion treatment is continued for a time sufficient for the aluminum and nickel to interdiffuse and form a nickel-aluminum alloy layer of at least 40 microns and preferably at least 80 microns in thickness. When the outer layer of the core is of substantially pure nickel, an interdiffused alloy layer of $NiAl_3$ forms in 1–10 minutes. Interdiffused nickel-aluminum alloy layers of 100–400 microns in thickness are preferred, with best results being obtained when the thicknesses are between 150- and 300-microns. Unless molybdenum is added to the nickel-containing layer, the treatment is stopped by about 30 minutes so that only a minimum amount of $Ni_2Al_3$ (Gamma phase) will form.

Since $NiAl_3$ has a higher proportion of aluminum than $Ni_2Al_3$, it is belived that temperature should be high enough to allow relatively fast interdiffusion yet not so high that the supply of aluminum is used up completely, because once the supply of "reservoir" aluminum in the aluminum layer is used up, further diffusion merely encourages the diffused aluminum to diffuse or spread out more thinly and thus encourages formation of $Ni_2Al_3$ or other less desirable intermetallics having a lower aluminum content than $NiAl_3$. As noted above, a temperature within the range of from about 660° C. to 860° C. satisfies this need. Similarly, the interdiffusion time should be long enough to build up an interdiffused nickel alloy layer of suitable thickness but not so long as to deplete the aluminum reservoir. An interdiffusion time within the range of from about 1 minute to about 30 minutes satisfies this need.

FIG. 5 presents a photomicrograph of a cross section of the β-Raney Ni-15Mo cathode formed from an interdiffused nickel-aluminum Beta phase alloy layer that was formed by dipping a Ni-15Mo substrate into molten aluminum and interdiffusing the nickel and aluminum at about 725° C. for about 10 minutes. The photomicrography shows the Ni-15Mo core, upon which is a relatively thin layer of Raneyed $Ni_2Al_3$, atop of which is comparatively thick layer of Raneyed $NiAl_3$. In FIG. 5, the β-Raney Ni 15-Mo cathode that is formed by leaching is derived almost entirely from the $Ni_{0.85}Mo_{0.15}Al_3$ phase. Nickel formed from the $Ni_{0.85}Mo_{0.15}Al_3$ phase is not lost from the active surface during the subsequent leaching step. It is found that the Raney surface layer derived from $Ni_{0.85}Mo_{0.15}Al_3$ is stabilized by the 15 percent by weight molybdenum. From about 5–20 percent by weight Mo is sufficient to stabilize the Beta phase intermetallic.

The size of the $Ni_2Al_3$ grains and the rate at which the thickness of the $Ni_2Al_3$-containing layer grows are highly dependent on whether the aluminum layer is depleted the length of heat treatment as well as on the temperature at which the aluminum and nickel are interdiffused. Larger grain size and much faster buildup of the $Ni_2Al_3$-containing layer accompanying the use of temperatures of 750° C. or more.

Referring now to the prior art, FIG. 6 of U.S. Pat. No. 4,116,804 shows the dependency of the average size of the $Ni_2Al_3$ grains on the temperature of interdiffusion. Note the rapid increase in grain size that occurs at interdiffusion temperatures of above 660° C., especially above 700° C. At interdiffusion temperatures below 660° C., the size of the $Ni_2Al_3$ grains are smaller than those found desirable for the later formation of the active porous nickel layer. Also, FIG. 7 of U.S. Pat. No. 4,116,804 shows, as a function of temperature, the time required for a 125 micron thick layer of $Ni_2Al_3$ to form on a nickel core that had been flame-sprayed with aluminum. Note the rapidly increasing times that are required to obtain a given thickness of the $Ni_2Al_3$ layer as the temperatures of interdiffusion are decreased. For the conditions shown in said FIG. 7, formation of the Gamma phase layer thickness requires over 74 hours at 560° C., over 29 hours at 600° C., over 4 hours at 725° C. and over 1 hour at 860° C. Thus the 1–30 minute time of heat treating in the present invention is much less and therefore less wasteful of fuel supplies and yet as noted elsewhere gives a coating that also uses less power in operation.

During the treatment at temperatures above 660° C., excessively long interdiffusion times, e.g. one hour or more, are avoided for technical, as well as economic reasons. Temperatures above about 860° C. are generally avoided because the equilibrium phase diagram for Al-Ni, which is depicted in FIG. 7 of the present invention for purposes of reference, shows that Beta phase transforms into liquid and Gamma phase ($Ni_2Al_3$) above about 855° C. Also, for coatings on a substrate differing in composition from the coating, extended heat treatment such as are needed to produce Gamma phase coatings might damage the substrate or form undesirable brittle intermetallics of the coating-substrate interface. For example, if aluminum is diffused into a nickel-coated-steel core, excessive interdiffusion time or temperature can result in the aluminum "breaking through" to the steel base of the core, i.e., the aluminum diffuses all the way through the nickel into the steel core. Breakthrough is accompanied by the formation of a very brittle $FeAl_3$ intermetallic phase, which can significantly undermine the strength of the bond between the core and the interdiffused layer. Also, if interdiffusion is continued too long, all of the available aluminum can be diffused into the nickel such that there is still a large excess of nickel in the interdiffused material. Under these latter circumstances, and also frequently when interdiffusion temperatures of above about 100° C. are used, an intermetallic phase forms, which does not permit satisfactory subsequent leaching of the aluminum from the intermetallic, and consequently, a highly active porous nickel does not form. By providing sufficient quantities of nickel and aluminum, while avoiding excessively long treatments or excessively high temperatures during interdiffusion, break-through and formation of the undesired intermetallics are avoided.

As described above, the aluminizing and interdiffusion steps are carried out sequentially. However, the steps can also be performed simultaneously by a pack-diffusion technique. For example, a mixture of aluminum and alumina powders and an activator can be packed around a nickel core and then heated in a hydrogen atmosphere at a temperature of 750° C. for about 8 hours to form the desired nickel-aluminum alloy layer.

The formation of the desired nickel-aluminum alloy layer is followed by a selective leaching step, wherein sufficient aluminum is removed from the surface and the nickel-aluminum alloy layer to form an active nickel surface layer. The average size of the active nickel agglomerates is generally less than 35 microns. Such an active layer is shown in cross section in the scanning-electron micrographs of FIGS. 5 and 6. Generally, a strong aqueous base, such as NaOH, KOH or other strongly basic solution capable of dissolving aluminum, is used in the selective leaching step. Preferably, the selective leaching is carried out in aqueous caustic solution containing about 1 to about 30 weight percent NaOH. For example, a selective leaching treatment of 20 hours in 10 percent NaOH at ambient conditions (i.e., temperature is not controlled) or a treatment of 14 hours in 10 percent NaOH at ambient temperatures followed by 6 hours in 30 percent NaOH at 100° C. has been found satisfactory for producing porous nickel surfaces of the invention. A preferred selective leaching procedure is carried out first for 2 hours in 1 percent NaOH, then for 20 hours in 10 percent NaOH, both of these substeps under conditions in which temperature is not controlled, and finally for 4 hours in 30 percent NaOH at 100° C. The leaching procedure removes at least about 60 percent, and preferably between about 75 and about 95 percent, of the aluminum from the interdiffused alloy layer and provides a porous nickel surface of unusually high electrochemical activity. It is recognized that the leaching conditions can be varied from those mentioned above to achieve effective selective dissolution of the aluminum.

After the selective leaching, the active nickel coatings may exhibit a tendency to heat when exposed to air. This self-heating tendency could possibly lead to problems of pyrophoricity. However, an optional step of chemically treating the porous nickel layer can be used to eliminate this potential problem. Convenient methods for this chemical treatment include immersing the porous nickel for at least 1 hour and usually less than 4 hours in a dilute aqueous solution containing, for example, by weight (a) 3 percent $NaNO_3$ or (b) 3 percent $K_2Cr_2O_7$ or (c) 3 percent $NaClO_3$ and 10 percent NaOH. These treatments eliminate the self-heating tendency of the porous nickel or nickel-molybdenum surface without diminishing its electrochemical activity or mechanical properties.

Although the active porous nickel surface layers, as prepared by the preceding steps, have satisfactory mechanical properties and low tendency to spall, compared with many of the Raney nickel surfaces of the prior art, the mechanical properties of the layer can be improved by optionally coating a very thin layer of nickel onto the porous surface. This nickel layer, which is preferably 5 to 10 microns thick and can be applied from conventional electroless nickel or nickel electroplating baths, enhances the mechanical strength of the porous nickel layer without diminishing its electrochemical activity.

SOME ADVANTAGES OF THE INVENTION

Contamination of low overvoltage coatings by overplatings of higher overvoltage metals has now been found to be one of the major obstacles to a long-life low overvoltage cathode, and was initially felt to be an insurmountable obstacle. However, overplating has now, in the cathodes of the invention, surprisingly and unexpectedly been virtually eliminated. This is a major technical breakthrough in enabling long-life, low overvoltage coatings. It has now been found that there is a threshold potential for such overplating and that when the cathode polarization potential is reduced below about −1.100 volts (as measured against a standard mercury-mercury oxide hydrogen electrode), i.e. below about 140 millivolts overvoltage, that fouling with higher overvoltage metals, such as for example iron and copper, and substantially eliminated. While it is practical to remove many metal contaminants other than iron and copper from the catholyte, there is somewhat more of a problem with iron and copper removal since the plumbing pipes carrying water to the cathode chamber are often copper, iron or steel and the cell housing itself is often made in whole or part of iron or steel for strength and electrical connections of the cell are often made of copper because of its relatively high conductivity. In conventional chlor-alkali cells, this contamination comes mostly from iron.

It has surprisingly and unexpectedly been found that this elimination of iron-fouling occurs in the most active cathodes, that is the cathodes having the lowest overvoltage. Thus the present invention gives the best of both worlds, an amazingly low overvoltage and an amazingly long life. Heretofore the two were felt to be incompatible objectives. Namely, it was believed that low overpotential cathode coatings suffered from short life. This is true even though stable metal anodes of low overpotential are known, because the problem with anodes was corrosion, not overplating. By its very nature, an anode tends to corrode while a cathode tends to receive deposits. Solving cathode corrosion alone does not give low overvoltage or even stable overvoltage. The explanation for this elimination of iron fouling is not definitely known.

One possible explanation is the anodic shift offhandedly reported in a recondite Russian fuel cell research article, Golin et al., "Connection Between Chemical and Electrochemical Activity of Raney Nickel Catalysts", Electrokhimiya, Vol. 13, No. 7, pp. 1052–1056 (USSR July, 1977). If this shift is such that the catalyst at rest has about the same potential as steel and then shifts 300 mV or so anodically in solution, there may be little or no residual electrical potential between steel and the coating during cell shut-downs to cause iron-fouling and yet when the cathode is in operation the anodic shift may lower overvoltage to near theoretical (as compared to steel cathodes which may not experience such a shift). Whatever the cause may actually be, the surprising result is a "non-fouling" cathode, i.e. one that does not experience any substantial iron fouling.

It has also now been found that yet another unexpected and surprising result is achieved when molybdenum is added to a Beta phase ($NiAl_3$) intermetallic. The Beta phase formation is stabilized by the addition of molybdenum in the amount of about 5–20 percent by weight of the total weight of nickel and molybdenum. This molybdenum is apparently captured in the ordered orthorhombic Beta phase crystal structure such that the Beta phase can be represented by the formula $Ni_xMo_{1-x}Al_3$ where x is the weight percent nickel in the total weight of nickel and molybdenum. By "stabilized" is meant that once the Beta phase forms it has less of a tendency to transform to Gamma phase ($Ni_2Al_3$) and thus the elevated heat treatment temperature can last longer without as much Gamma phase being formed. In fact, the heat treatment at the optimum 725° C. can last for 2 hours, or 4 hours or even 6 hours with a $\beta$-Raney Ni-Mo cathode still being produced. Since it is now shown that the Beta phase is the intermetallic of choice, this is an important advantage of the Ni-Mo-Al ternary alloy over the Ni-Al binary alloy.

It has further been found that the use of Mo in the coating reduces the heat of desorption of hydrogen (determined by gas phase desorption) and that this reduction correlates directly with the reduced overpotential of the Raney nickel with 5–20 percent by weight molybdenum as compared with pure Raney nickel, both having been prepared from Beta phase intermetallic precursors. It has further been found that the Beta phase nickel indeed has a lower heat of desorption than the Gamma phase, as previously reported in the Zavorin et al Russian article noted above.

The preferred electrode is a monolithic structure of a Ni-Mo alloy of 5–20 percent and most preferably from about 12–18 percent by weight molybdenum and about 80–95 percent and most preferably 82–88 percent by weight nickel which has been given a Raney treatment by dipping in molten aluminum and heating for about 1–30 minutes in an inert atmosphere at a temperature of from about 660° C. to about 855° C. A temperature of about 700° C. to about 750° C. and a time of about 5–15 minutes are more preferred because this gives sufficient time for enough aluminum to interdiffuse into the nickel to provide maximum preponderance of $NiAl_3$ or Beta phase over Gamma phase ($Ni_2Al_3$) but does not allow enough time for the diffusion to result in the preponderance of Gamma phase ($Ni_2Al_3$) as was specifically called for in U.S. Pat. No. 4,116,804, noted above.

Contrary to the disclosure of U.S. Pat. No. 4,116,804, it has been surprisingly found that the Beta phase $NiAl_3$ when molybdenum is added thereto, is not lost during leaching and in fact experiences no appreciable thinning during subsequent use in a chlor-alkali cell. (see FIGS. 5 and 6).

It was initially hypothesized that the non-fouling nature of the $NiAl_3$ surface layer was due to a gradual slow erosion and falling of the individual outermost $NiAl_3$ grains along with any iron which had been deposited thereon. In fact, is was even thought that such slow continual erosion would be desirable to prevent iron buildup on the cathode surface, even though such erosion would make for a shorter cathode life than if there were no such erosion. However, it is most unexpected and startling to find that there was no substantial erosion of the coating and that even though there was no substantial erosion the cathode did not pick up any substantial amount of iron. The additional molybdenum had apparently lowered the overvoltage below some threshold level where iron fouling ceases to occur.

The surprising non-thinning of the $NiAl_3$ type coatings indicates there is probably some other as yet unknown cause for the unexpected superior resistance of the $NiAl_3$ coating to iron fouling. In view of the teaching of U.S. Pat. No. 4,116,804 that $NiAl_3$ is mechanically weak, it was not expected that molybdenum addition would result in a stabilized layer.

In fact, U.S. Pat. No. 3,947,331, issued Mar. 30, 1976 to ANVAR with Kinh and Montvelle as inventors, teaches that codeposits of nickel and molybdenum conventionally give layers of little mechanical strength, porous, fissured and incompatible with any practical industrial use. Such fissuring might conceivably be useful in some crystalline coatings which are not given a Raney treatment since such coatings might benefit from the increased surface area generated by such fissures. However, with a Raney surface further fissuring would seem to be harmful, rather than helpful, because such fissuring would seemingly tend to make the already ragged Raney microstructure break apart and fall off. In Raney coatings, the ordinary artisan seeks strength, not weakness. Thus it was not only surprising but rather startling tht the Raney nickel coating with added molybdenum could survive in a typical chlor-alkali cell environment without any appreciable thinning of the coating.

Advantageous use can be made of the electrodes of the invention, especially as hydrogen-evolution cathodes of cells intended for the electrolysis of brine, water or the like. The electrodes are particularly preferred for use in brine electrolysis cells, wherein the high electrochemical activity of the $\beta$-Raney nickel or nickel-molybdenum surface remains constant for long periods of extended continuous use. When the electrode is intended for use in a brine-electrolysis diaphragm cell, the diaphragm can be applied directly to the porous nickel surface of the electrode. For example, a tubular screen electrode of the invention, with suction established through the inside of the tube, can be immersed in an aqueous dispersion of polytetrafluoroethylene fibers and asbestos fibers. The fibers are sucked onto the outer surface of the screen until a diaphragm of the desired thickness is formed. After removal of the suction, water is removed from the assembly, as for example, by heating at 95° C. for 5 hours. The assembly is then heated at 350° C. for about one-half hour in an inert atmosphere, to complete the diaphragm fabrication. As is known in the art, the satisfactory operating lifetime of such diaphragms is not nearly as long as that of the cathodes of the brine electrolysis cells. Economics dictates that the diaphragms must be changed several times during the operating life of the cathode. With electrodes of the present invention, the diaphragms can be readily stripped from the porous nickel surface and replaced many times with insignificant detriment to the electrochemical activity or mechanical properties of the electrode. Similarly satisfactory results are also obtained with other diaphragm materials and with membrane materials (such as cationic exchange membranes of hydrophilic phosphonated, sulfonated or carboxylated fluorocarbontelomers blended with inert fibers such as asbestos, glass, tetrafluoroethylene and polytetrafluoroethylene).

TEST METHODS

The various parameters associated with the present invention are measured by the techniques described below.

THICKNESS OF POROUS NICKEL LAYER

Scanning electron micrograph cross sections are prepared perpendicular to the surface of the electrode. Micrographs are taken of typical areas of the cross section. A convenient magnification, usually between 150 and 700 X permits inclusion of the entire thickness of the porous nickel layer in the photomicrograph. The thickness of the porous nickel layer is determined by measuring the layer thickness depicted in the photomicrograph and dividing by the magnification. At least five such measurements are made on at least three micrographs and then averaged to obtain the thickness of the porous layer of the electrode. For electrodes of the invention, this provides thickness measurements having a coefficient of variation of generally less than 5 percent. Photomicrographs of the type that can be used to make these thickness measurements are given in FIGS. 5 and 6.

SURFACE POROSITY AND AVERAGE AGGLOMERATE SIZE

Scanning electron micrographs are prepared of randomly selected areas of the surface of the porous nickel layer of the electrode. The magnification is conveniently set between about 100 and 500X. The micrograph is printed on photographic paper of uniform weight. As can be seen from the scanning electron micrograph of FIG. 5 or 6, the individual agglomerates of the porous nickel of the electrodes of the invention (labelled "A") are readily identifiable; the dark areas between and within the agglomerates (labelled "B") depict the porous regions. Generally, a magnification is selected so that at least five full agglomerates are displayed in the photomicrograph. The surface porosity and the average agglomerate size can be measured from the micrographs as follows:

1. From a prepared micrograph depicting a typical area of the surface of the electrode, cut away the agglomerates that are only partially shown at the edges of the mocrograph. In deleting the partial agglomerates, cut along the centerline of the porous region between the partial agglomerate and the closest whole agglomerate. Measure the area of the remaining portion of the micrograph. The area of the micrograph divided by the square of the magnification equals the actual area, S, of the surface being analyzed. Determine the weight, W, of the cut-out area.

2. Count the number of agglomerates, N, within the cut-out area of the micrograph that lie in the plane of the surface of the specimen. Those that clearly lie in a plane below the surface of the specimen are not counted.

3. Subdivide the cut-out portion of the micrograph into subcuttings of areas depicting the agglomerates in the plane of the specimen surface and areas depicting porous regions in the plane of the specimen surface. In making these subdivisions care is taken to include in the porous area of the specimen surface, the areas of the cut-out micrograph that are shown as (a) black regions, (b) agglomerates that are clearly beneath the plane of the specimen surface and (c) sides of agglomerates, lying below and at an angle to the plane of the specimen surface (usually appearing as a somewhat lighter shade than the black porous regions).

4. Weigh the cuttings representing the agglomerates, $w_a$, and the cuttings representing the porous regions, $w_p$, and assure that no cuttings were lost by checking that $w_a + w_p = W$.

5. Calculate the surface porosity, P, expressed as a percentage, from $P = (w_p/W)\ 100$.

6. Calculate the agglomerate size, D, from $$D = [S/N(1-P/100)]^{\frac{1}{2}}.$$

7. Make replicate measurements to determine average values for the samples studied. For electrode of the invention, five replicate measurements are usually sufficient to result in average values of P and D having coefficients of variations of less than 10 percent.

An alternative method for measuring the average agglomerate size, D, is to (1) cut out at least five typical agglomerates from each of five micrographs taken at the same magnification, X, of the surface of the electrode; (2) determine the total weight, w, and number, n, of the cut-out agglomerates; (3) measure K, the weight per unit area of the micrograph paper; and (4) calculate the average agglomerate size from $$D = [(w/n)/K]^{\frac{1}{2}}[1/X]$$

NICKEL-ALUMINUM ALLOY LAYER PRIOR TO LEACHING

Separate micrographs of the intermetallic precursors are not needed since the structure can be ascertained readily from the leached sample. The leaching is seldom, if ever, continued long enough to leach clear through to the core or substrate, as that would tend to dissolve any intermetallics at the core coating interface and thus tend to loosen the coating from the core. Thus a layer of unleached alloy is generally available for viewing in the micrographs of the Raneyed coating.

However, separate micrographs of the unleached layer could be made as follows:

Metallographic cross sections are prepared perpendicular to the surface of the precursor of the electrode, that is, after the interdiffusion treatment but prior to the selective leaching step. Plane polarized light is used. Photomicrographs are taken of typical areas of the cross section to include the lever containing the nickel-aluminum alloy. Convenient magnifications are between 150 and 700X. The thickness of the nickel-aluminum binary or nickel-molybdenum-aluminum ternary alloy layer is then determined in the same manner as described above for the thickness of the porous nickel layer.

When the nickel-aluminum alloy layer is of $Ni_2Al_3$ or $NiAl_3$, measurement of the size of the grains is facilitated by superimposing a grid on the photomicrograph of the layer. Then squares of the grid are randomly selected from the middle 80 percent of the $NiAl_3$ or $Ni_2Al_3$ containing layer. The total number of grains, Z, within the boundary of each square is counted. The area of the grid on the photomicrograph divided by the square of the magnification is the actual area, A, of the layer under examination. The size, d, of the $NiAl_3$ or $Ni_2Al_3$ grains in the layer, for each grid are examined, is then calculated from $d = (A/Z)^{\frac{1}{2}}$. This formula holds for the layers that consist essentially of $NiAl_3$ or $Ni_2Al_3$ grains. The average $NiAl_3$ or $Ni_2Al_3$ grain size for a given sample is then simply the average of the size of the grains for each of the 10 grids. To characterize the $NiAl_3$ or $NiAl_3$ grain size in the precursor of the electrode of the invention, at least three photomicrographs of the cross section are subjected to the above analysis and result in a measurement that has a coefficient of variation of less than 5 percent.

METALLOGRAPHIC SPECIMENS

The cross sections to be subjected to the micrographic examinations described above are prepared as follows. A sample is cut and sectioned by use of a diamond saw operating at low speed. The specimen is then mounted in an epoxy resin. Convenient dimensions for the cross section of the specimen are about 6 by 13 millimeters. Primary polishing of the specimen is carried out on a polishing wheel equipped with silicon carbide papers of grades 240A, 400A and 600A. Fine polishing is then accomplished by use of (a) 1.0 micron levigated $\alpha$-alumina on a felt-covered wheel and then (b) 0.05 micron levigated $\gamma$-alumina on a micro-cloth-covered wheel.

ELECTROCHEMICAL CELL

Figure 8:
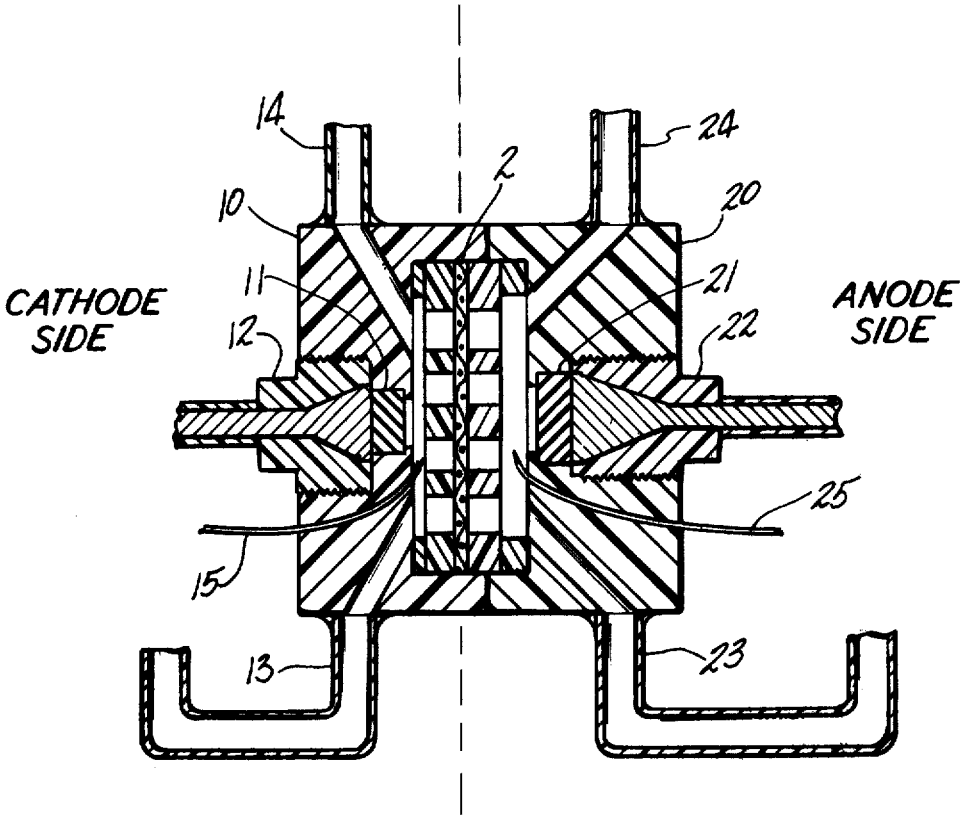
FIG. 8 is a vertical cross section through an exemplary laboratory electrolysis cell with which the invention may be used.

FIG. 8 shows the structure of a test cell used for measuring the cathode potentials of the various plate electrodes of the samples given below.

ELECTROCHEMICAL MEASUREMENTS

A schematic diagram of an electrochemical test cell, used for measuring the cathode potentials of the various plate electrodes of the examples below, is given in FIG. 8.

Test cell 1, made of tetrafluoroethylene ("TFE"), is divided by diaphragm 2 into two chambers, cathode chamber 10 and anode chamber 20. The diaphragm, which is placed between two TFE separators sealed in place by caustic-resistant gaskets, is made of Nafion® 227, which is a homogeneous film 7 mils thick of 1200 equivalent weight perfluorosulfonic acid resin which has been chemically modified by ethylene diamine converting a depth of 1.5 mils to the perfluorosulfonamide laminated with a "T-12" tetrafluoroethylene filament fabric marketed by duPont.

A circular titanium anode 21 of two square centimeter area coated with a titanium oxide-ruthenium oxide mixed crystal is installed at the end of the cathode in the anode chamber. Test electrode 11, which becomes the cathode of the test cell, is installed at the end of the cathode chamber by means of flanges and gaskets (not shown). Perforated tetrafluoroethylene separators 3 and 4 are placed between membrane 2 and anode 21 and cathode 11, respectively.

A circular area of one square centimeter of the porous nickel surface of the test electrode is exposed to the interior of the cathode compartment. The cathode and anode are connected electrically to controllable voltage source by cathode current collector 12 and anode current collector 22. An ammeter is connected in the line between the two electrodes. The entire cell 10 is then immersed in a thermostated liquid bath so as to give a constant operating temperature (e.g., 85° C.).

Catholyte, consisting of an aqueous solution, containing 11 weight percent sodium hydroxide and 15 weight percent sodium chloride, is pumped through inlet 13 into the cathode compartment at a rate which establishes an overflow through outlet 14. The catholyte is maintained at 85° C. Similarly, anolyte, consisting of an aqueous solution of 1.5 pH containing 24–26 weight percent sodium chloride is pumped through inlet 23 into the anode compartment and overflowed through outlet 24. The salt concentrations of the catholyte and anolyte are typical of that encountered in commercial brine electrolysis cells. The use of separate catholyte and anolyte feeds, rather than a single brine feed, assures better control of the desired catholyte composition. The catholyte and anolyte flows are controlled so that there is a small flow of solution from the anode to the cathode compartment, which flow is sufficient to assure ionic conductivity across the cell, but insufficient to significantly affect the catholyte composition.

Luggin tetrafluoroethylene capillary 25, installed in the cathode chamber 10 and Luggin capillary 15 installed in the cathode chamber 10 and positioned ½ mm from the surface are each connected to a respective mercury-mercury oxide reference electrode or "S.H.E." (not shown), which in turn is connected through voltmeter 6, to the other electrode of cell 10. A Luggin capillary is a probe which, in making ionic or electrolytic contact between the anode or cathode and the reference electrode, minimizes the voltage drop due to solution resistance and permits direct measurement of the anode or cathode potential with respect to the reference electrode.

To determine the cathode potential of a test electrode, a voltage is impressed between the anode and test electrode (i.e., cathode), such that a current density of 200 ma/cm$^2$ is established at the cathode. The current density is the current measured by the ammeter in milliamps divided by the area (i.e., 1 cm$^2$) of the porous nickel surface of the test electrode exposed to catholyte. Thus 200 ma would be applied to cathode 11 to achieve a current density of 200 ma/cm$^2$. Hydrogen gas, generated at the cathode is removed from the cathode compartment through catholyte outlet 14. Chlorine gas, generated at the platinum anode, is similarly removed through anolyte outlet 24. The cell is operated in this manner for at least 2 hours prior to reading the cathode potential directly from the voltmeter.

EXAMPLES

In each of the examples, electrodes are prepared and tested as cathodes in brine electrolysis test cells. All characterizations are carried out in accordance with the test procedures described above. Unless stated otherwise, all compositions are given as weight percentages.

EXAMPLE 1

Five groups of test electrodes are prepared as follows:

1. Mild Steel.

A thoroughly cleaned mild steel coupon.

2. G-Raney Ni on nickel core (prior art).

A 1.6-mm-thick nickel 200 sheet, assaying at least 99 percent nickel, is cut into a coupon measuring about one cm$^2$. The coupon which is to become the core of the electrode is thoroughly cleaned by degreasing with acetone, lightly etching with 10 percent HCl, rinsing with water and after drying, grit blasting with No. 24 grit $Al_2O_3$ at a pressure of 3.4 kg/cm$^2$ (50 psi).

The cleaned nickel coupon is aluminized by flame-spraying a 305-micron-thick coating of aluminum on the surface of the nickel coupon. A conventional plasma-arc spray gun operating at 13 to 16 kilowatts at a distance about 10 cm from the coupon is used with aluminum powder of −200 to +325 mesh.

The aluminized nickel coupon is heat treated at 760° C. for 8 hours in a nitrogen atmosphere to interdiffuse the nickel and aluminum and form a layer which is predominantly Gamma phase ($Ni_2Al_3$) nickel aluminide. After heat treating, the coupon is allowed to cool in a current of nitrogen for about 2 hours. This produces a predominantly $Ni_2Al_3$ interdiffused layer.

The remaining coupon is then subjected to a leaching treatment wherein the aluminum is selectively removed from the interdiffused layer to leave an active porous nickel surface on the coupon. The leaching treatment consists of immersing the interdiffused coupon in 10 percent NaOH for 20 hours, without temperature control, followed by 4 hours in 30 percent NaOH at 100° C. The coupon is then rinsed with water for 30 minutes.

3. β-Raney Ni on nickel core (plasma sprayed).

A 1.6-mm-thick nickel 200 sheet, assaying at least 99 percent nickel, is cut into a coupon measuring about one $cm^2$. The coupon which is to become the core of the electrode is thoroughly cleaned by degreasing with acetone, lightly etching with 10 percent HCl, rinsing with water and after drying, grit blasting with No. 24 grit $Al_2O_3$ at a pressure of 3.4 $kg/cm^2$ (50 psi).

The cleaned nickel coupon is aluminized by flame-spraying a 305-micron-thick coating of aluminum on the surface of the nickel coupon. A conventional plasma-arc spray gun operating at 13 to 16 kilowatts at a distance about 10 cm from the coupon is used with aluminum powder of −200 to +325 mesh.

The aluminized nickel coupon is heat treated at 725° C. for 10 minutes in a nitrogen atmosphere to interdiffuse the nickel and aluminum and form a layer which is predominantly [Gamma] *Beta* phase [($Ni_2Al_3$)] (*$NiAl_3$*) nickel alumninide. After heat treating, the coupon is allowed to cool in a current of nitrogen for about 2 hours. This produces a predominantly $NiAl_3$ interdiffused layer.

The remaining coupon is then subjected to a leaching treatment wherein the aluminum is selectively removed from the interdiffused layer to leave an active porous nickel surface on the coupon. The leaching treatment consists of immersing the interdiffused coupon in 10 percent NaOH for 20 hours, without temperature control, followed by 4 hours in 30 percent NaOH at 100° C. The coupon is then rinsed with water for 30 minutes.

4. β-Raney Ni on nickel core (dipped).

A 1.6-mm-thick nickel 200 sheet, assaying at least 99 percent nickel, is cut into a coupon measuring about one $cm^2$. The coupon which is to become the core of the electrode is thoroughly cleaned by degreasing with acetone, lightly etching with 10 percent HCl, rinsing with water and after drying, grit blasting with No. 24 grit $Al_2O_3$ at a pressure of 3.4 $kg/cm^2$ (50 psi).

The cleaned nickel coupon is aluminized by applying a commercial flux and then dipping in a pot of molten aluminum for a sufficient time to entirely coat the coupon with aluminum.

The aluminized nickel coupon is heat treated at 725° C. for 10 minutes in a nitrogen atmosphere to interdiffuse the nickel and aluminum and form a layer which is predominantly [Gamma] *Beta* phase [($Ni_2Al_3$)] (*$NiAl_3$*) nickel alumninide. After heat treating, the coupon is allowed to cool in a current of nitrogen for about 2 hours. This produces a predominantly $NiAl_3$ interdiffused layer.

The remaining coupon is then subjected to a leaching treatment wherein the aluminum is selectively removed from the interdiffused layer to leave an active porous nickel surface on the coupon. The leaching treatment consists of immersing the interdiffused coupon in 10 percent NaOH for 20 hours, without temperature control, followed by 4 hours in 30 percent NaOH at 100° C. The coupon is then rinsed with water for 30 minutes.

5. β-Raney Ni-15Mo on Ni-15Mo core (dipped). A 1.6-mm-thick sheet of an alloy assaying at least 84 percent nickel and 15.0±0.1 percent Mo (Ni-15Mo) is cut into a circular coupon measuring about one $cm^2$. The coupon which is to become the core of the electrode is thoroughly cleaned by degreasing with acetone, lightly etching with 10 percent HCl, rinsing with water and after drying, grit blasting with No. 24 grit $Al_2O_3$ at a pressure of 3.4 $kg/cm^2$ (50 psi).

The cleaned nickel-molybdenum coupon is aluminized by applying a commercial flux and then dipping in a pot of molten aluminum for a sufficient time to entirely coat the coupon with aluminum.

The aluminized nickel-molybdenum coupon is heat treated at 725° C. for 10 minutes in a nitrogen atmosphere to interdiffuse the nickel and aluminum and form a layer which is predominantly [Gamma] *Beta* phase [($Ni_2Al_3$)] nickel *molybdenum* aluminide (*(Ni-15MO)$Al_3$*). After heat treating, the coupon is allowed to cool in a current of nitrogen for about 2 hours. This produces a predominantly [$NiAl_3$] *Ni-15MO$Al_3$* interdiffused layer.

The remaining coupon is then subjected to a leaching treatment wherein the aluminum is selectively removed from the interdiffused layer to leave an active porous nickel-molybdenum surface on the coupon. The leaching treatment consists of immersing the interdiffused coupon in 10 percent NaOH for 20 hours, without temperature control, followed by 4 hours in 30 percent NaOH at 100° C. The coupon is then rinsed with water for 30 minutes.

The cathode potentials are monitored for 45 days to determine if the potential experiences a steady increase or instead levels out at some value.

The results are plotted in FIG. 1. It is seen that the Raney Ni-15Mo from Beta phase precursor is constant from start to finish at a lower level than the other four samples and that the Gamma phase sample, which initially had a potential of about 120 mV more cathodic than the Raney Ni-15Mo, after 45 days has about 320 mV more cathodic potential. Also, the Raney Ni (without molybdenum) from Beta phase initially has 50 mV and 90 mV more cathodic potential than the Raney Ni-15Mo from Beta precursor (dipped) depending on whether dipped or plasma sprayed. However, the Raney Ni from Beta precursor without added molybdenum experiences an increase in cathodic potential of about 50 millivolts over the 45 day test. It is also seen that clean mild steel initially had a potential drop of about 150 mV and then slowly increased back to its original starting value of about −1.500 volts. The constant low overpotential of 60 millivolts for the Raney Ni-15Mo from Beta phase precursor is unexpected.

EXAMPLE 2

A β-Raney Ni-15Mo coupon of the invention is prepared by the same procedure as for coupon 5 of Example 1. A second coupon of the invention is prepared by the same procedure as for coupon 2 of Example 1 except that instead of a 99 percent—nickel sheet a $Ni_{0.90}Mo_{0.10}$ sheet is used instead, so as to produce a β-Raney Ni-10Mo (plasma sprayed).

The results are plotted in FIG. 2 as cathode polarization potential (IR Free) versus current density. β-Raney Ni-15Mo has 20–40 millivolts less polarization, i.e., less overvoltage. At a typical current density for diaphragm of 200 ma/cm$^2$, the cathodic potential is about 0.97 volts for β-Raney Ni-10Mo (plasma sprayed) and about −0.93 volts for β-Raney Ni-15Mo (dipped). At 200 ma/cm$^2$ a typical IR Free cathodic potential for the mild steel electrode of Example 1 was −1.28 volts (see FIG. 4).

EXAMPLE 3

The coupons of Example 2 are tested for 45 days at 200 ma/cm$^2$ current density in the standard catholyte (15 percent NaCl, 11 percent NaOH, 0.1 percent $NaClO_3$, 73.9 percent $H_2O$ at 85° C.) and measured against a mercury, mercury oxide ("Standard Hydrogen Electrode" or "S.H.E.") by the electrochemical measurement technique noted above. Two coupons of β-Raney Ni-15Mo (dipped) and one coupon of β-Raney Ni-10Mo (plasma sprayed) are used. The β-Raney Ni-15Mo (dipped) coupons each have a constant cathodic potential of −1.03 volts (90 millivolts overpotential) while the β-Raney Ni-10Mo (plasma sprayed) has a slowly fluctuating cathodic potential of −1.04 to −1.140 volts versus the S.H.E. The potential β-Raney Ni-10Mo (plasma sprayed) levels out after about 4 weeks and remains steady at −1.08 volts (140 millivolts) overpotential.

EXAMPLE 4

A first coupon is prepared according to the same procedure as prescribed for coupon 2 of Example 1 to yield a prior art G-Raney Ni coated Ni cathode. A second coupon is prepared according to the same procedure as prescribed for coupon 3 of Example 1 to yield a β-Raney Ni coated Ni cathode of the invention. A third coupon is prepared according to the method prescribed for coupon 1 of Example 1 to yield a mild steel cathode. The IR Free polarization curves versus current density are determined by electrochemical measurements for the three coupons in a standard catholyte as described above. The β-Raney Ni cathode of the invention has about 60 millivolts less polarization potential at 200 ma/cm$^2$ than the prior art G-Raney Ni cathode. Also plotted for reference is the β-Raney Ni-15Mo (dipped) coated Ni-15Mo cathode of FIG. 2 and Example 2. The β-Raney Ni-15Mo (dipped) cathode of the invention has about 110 millivolts less overpotential at 200 ma/cm$^2$.

What is claimed is:

1. An improved low overvoltage electrode for use as a hydrogen evolution cathode in an electrolytic cell, the electrode being of the type that has a Raney metal surface layer in electrical contact with a conductive metal core, wherein the improvement comprises: said Raney metal surface layer is predominantly derived from *an* adherent *predominantly beta phase* $Ni_xMo_{1-x}Al_3$ crystalline precursory surface layer structure, where x is no more than 0.95.

2. The electrode of claim 1 wherein x is within the range of from about 0.80 to about 0.95.

3. The electrode of claim 2 wherein the thickness of said Raney metal surface is less than about $7.5\times10^{-5}$ meters (i.e., 75 microns or 3 mils).

* * * * *